(12) United States Patent
Kiyota et al.

(10) Patent No.: US 12,506,328 B2
(45) Date of Patent: Dec. 23, 2025

(54) SEMICONDUCTOR OPTICAL AMPLIFIER ARRAY DEVICE

(71) Applicant: FURUKAWA ELECTRIC CO., LTD., Tokyo (JP)

(72) Inventors: Kazuaki Kiyota, Tokyo (JP); Masahiro Yoshida, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 1005 days.

(21) Appl. No.: 17/583,531

(22) Filed: Jan. 25, 2022

(65) Prior Publication Data

US 2022/0149597 A1   May 12, 2022

Related U.S. Application Data

(63) Continuation of application No. PCT/JP2020/029723, filed on Aug. 3, 2020.
(Continued)

(30) Foreign Application Priority Data

Jan. 27, 2020 (JP) ................. 2020-011120

(51) Int. Cl.
*H01S 3/00* (2006.01)
*H01S 5/0225* (2021.01)
(Continued)

(52) U.S. Cl.
CPC .......... *H01S 5/5018* (2013.01); *H01S 5/0225* (2021.01); *H01S 5/1057* (2013.01)

(58) Field of Classification Search
CPC ..... H01S 5/5018; H01S 5/0225; H01S 5/1057
See application file for complete search history.

(56) References Cited

U.S. PATENT DOCUMENTS

| | | |
|---|---|---|
| 6,400,500 B1 | 6/2002 | Tidmarsh et al. |
| 9,054,486 B2 | 6/2015 | Hasegawa et al. |

(Continued)

FOREIGN PATENT DOCUMENTS

| | | | | |
|---|---|---|---|---|
| JP | 11-174254 A | 7/1999 | | |
| JP | 2000250081 | * 9/2000 | ............... | H01S 5/50 |

(Continued)

OTHER PUBLICATIONS

Combined Chinese Office Action and Search Report issued Jul. 21, 2023 in Chinese Patent Application No. 202080055291.8, (with unedited computer-generated English translation), 12 pages.

(Continued)

*Primary Examiner* — Mark Hellner
(74) *Attorney, Agent, or Firm* — Oblon, McClelland, Maier & Neustadt, L.L.P.

(57) ABSTRACT

A semiconductor optical amplifier array device includes: a substrate; and a plurality of semiconductor optical amplifiers formed on the substrate, each of the semiconductor optical amplifiers including an active region, and two input-output ports optically connected to the active region and disposed on same facet of the semiconductor optical amplifier array device. The plurality of semiconductor optical amplifiers include a first semiconductor optical amplifier in which length of the active region is equal to a first length, and a second semiconductor optical amplifier in which length of the active region is equal to a second length that is different from the first length.

2 Claims, 5 Drawing Sheets

Related U.S. Application Data

(60) Provisional application No. 62/882,369, filed on Aug. 2, 2019.

(51) Int. Cl.
*H01S 5/10* (2021.01)
*H01S 5/50* (2006.01)

(56) References Cited

U.S. PATENT DOCUMENTS

| | | | | |
|---|---|---|---|---|
| 10,320,151 | B1* | 6/2019 | Traverso | H01S 5/1203 |
| 2008/0240645 | A1 | 10/2008 | Funabashi et al. | |
| 2010/0111468 | A1* | 5/2010 | Funabashi | G02B 6/12004 |
| | | | | 385/14 |
| 2012/0128375 | A1 | 5/2012 | Kimoto et al. | |
| 2013/0121632 | A1* | 5/2013 | Akutsu | G02B 6/1228 |
| | | | | 385/11 |

FOREIGN PATENT DOCUMENTS

| | | | |
|---|---|---|---|
| JP | 2002-303900 A | 10/2002 | |
| JP | 2002-532909 A | 10/2002 | |
| JP | 2008-250019 A | 10/2008 | |
| JP | 2009-117539 A | 5/2009 | |
| JP | 2011-35060 A | 2/2011 | |
| JP | 2011-165823 A | 8/2011 | |
| JP | 2013-058628 A | 3/2013 | |
| JP | 2015-138926 A | 7/2015 | |
| JP | 2016-162798 A | 9/2016 | |
| JP | 2017-98362 A | 6/2017 | |
| JP | 2018-189875 A | 11/2018 | |
| WO | WO 2013/035259 A1 | 3/2013 | |
| WO | WO 2019/048740 A1 | 3/2019 | |

OTHER PUBLICATIONS

Japanese Office Action issued Jul. 11, 2023 in Japanese Application 2020-011120, (with unedited computer-generated English translation), 6 pages.

Japanese Office Action issued Nov. 21, 2023 in Japanese Application 2020-011120, (with unedited computer-generated English translation), 6 pages.

International Search Report issued Oct. 20, 2020 in PCT/JP2020/029723 filed on Aug. 3, 2020, 4 pages.

Griffin et al., "InP Coherent Optical Modulator with Integrated Amplification for High Capacity Transmission", Optical Fiber Communication Conference 2015, Mar. 2015, 3 pages.

Yagi et al., "InP-Based Monolithically Integrated Photonic Devices for Digital Coherent Transmission", IEEE Journal of Selected Topics in Quantum Electronics, vol. 24, No. 1, 2017, 12 pages.

Matsumoto et al., "Hybrid-Integration of SOA on Silicon Photonics Platform Based on Flip-Chip Bonding", Journal of Lightwave Technology, vol. 37, No. 2, Jan. 15, 2019, pp. 307-313.

* cited by examiner

SEMICONDUCTOR OPTICAL AMPLIFIER ARRAY DEVICE

This application is a continuation of International Application No. PCT/JP2020/029723, filed on Aug. 3, 2020 which claims the benefit of priority of the U.S. Provisional Application No. 62/882,369, filed on Aug. 2, 2019, and the prior Japanese Patent Application No. 2020-011120, filed on Jan. 27, 2020, the entire contents of which are incorporated herein by reference.

BACKGROUND

The present disclosure is related to a semiconductor optical amplifier array device.

In optical communication systems, there is widespread application of digital coherent communication in which the digital coherent technique is used. The digital coherent communication used to be applied for long distances (long hauls). In recent years, the applicable distance for digital coherent communication has become shorter, and the digital coherent technique has been increasingly used in metro systems or among datacenters too. As far as the modulators in the transmitters of a digital coherent communication system are concerned, in addition to the use of LN modulators that are available from long ago, InP modulators having the InP-based semiconductor material used therein and modulators having the Si photonics used therein are being increasingly used.

Generally, a transmitter is desired to have a high output performance. In that regard, as explained in R. A. Griffin et al., "InP Coherent Optical Modulator with Integrated Amplification for High Capacity Transmission," Optical Fiber Communication Conference 2015, Th4E.2, an InP modulator more often than not includes a semiconductor optical amplifier (SOA) integrated therein. with reference to Non Patent Literature 1, a modulator includes four semiconductor optical amplifiers. Two of those semiconductor optical amplifiers are "pre-stage semiconductor optical amplifiers" that amplify the continuous light input thereon, and the other two semiconductor optical amplifiers are "post-stage semiconductor optical amplifiers" that amplify modulated light.

In a modulator in which the Si photonics is used; because of the fact that Si is a material with an indirect bandgap, it is difficult to integrate light emitting devices. As one of the approaches for integrating light emitting devices in an Si photonics device, as explained in T. Matsumoto et al., "Hybrid-Integration of SOA on Silicon Photonics Platform Based on Flip-Chip Bonding," JOURNAL OF LIGHTWAVE TECHNOLOGY, VOL. 37, NO. 2, pp. 307-313, there is a method of "hybrid integration" of an InP chip on an Si photonics chip. As a result of applying that technique in a modulator, a semiconductor optical amplifier can be used along with a photonics modulator.

As far as a semiconductor optical amplifier meant for hybrid integration is concerned, a semiconductor optical amplifier having a U-turn structure has been disclosed in International Laid-open Pamphlet No. 2013/035259. In a semiconductor optical amplifier having a U-turn structure; an input port, to which the light to be amplified is input, and an output port, which outputs the amplified light, are formed on the same facet, and a bent waveguide is also provided in which the light path is folded. As a result of using such a configuration, the optical coupling positions with the Si photonics chips having different waveguides can be brought together on the same facet, thereby making it easier to achieve hybrid packaging.

SUMMARY

In the known technique, there has been no study about the most suitable device design for the case in which, when a plurality of semiconductor optical amplifiers is integrated, some of them have mutually different intended end-usages on account of having different characteristics.

According to one aspect of the present disclosure, there is provided a semiconductor optical amplifier array device including: a substrate; and a plurality of semiconductor optical amplifiers formed on the substrate, each of the semiconductor optical amplifiers including an active region, and two input-output ports optically connected to the active region and disposed on same facet of the semiconductor optical amplifier array device, wherein the plurality of semiconductor optical amplifiers include a first semiconductor optical amplifier in which length of the active region is equal to a first length, and a second semiconductor optical amplifier in which length of the active region is equal to a second length that is different from the first length.

DETAILED DESCRIPTION

Figure 1:
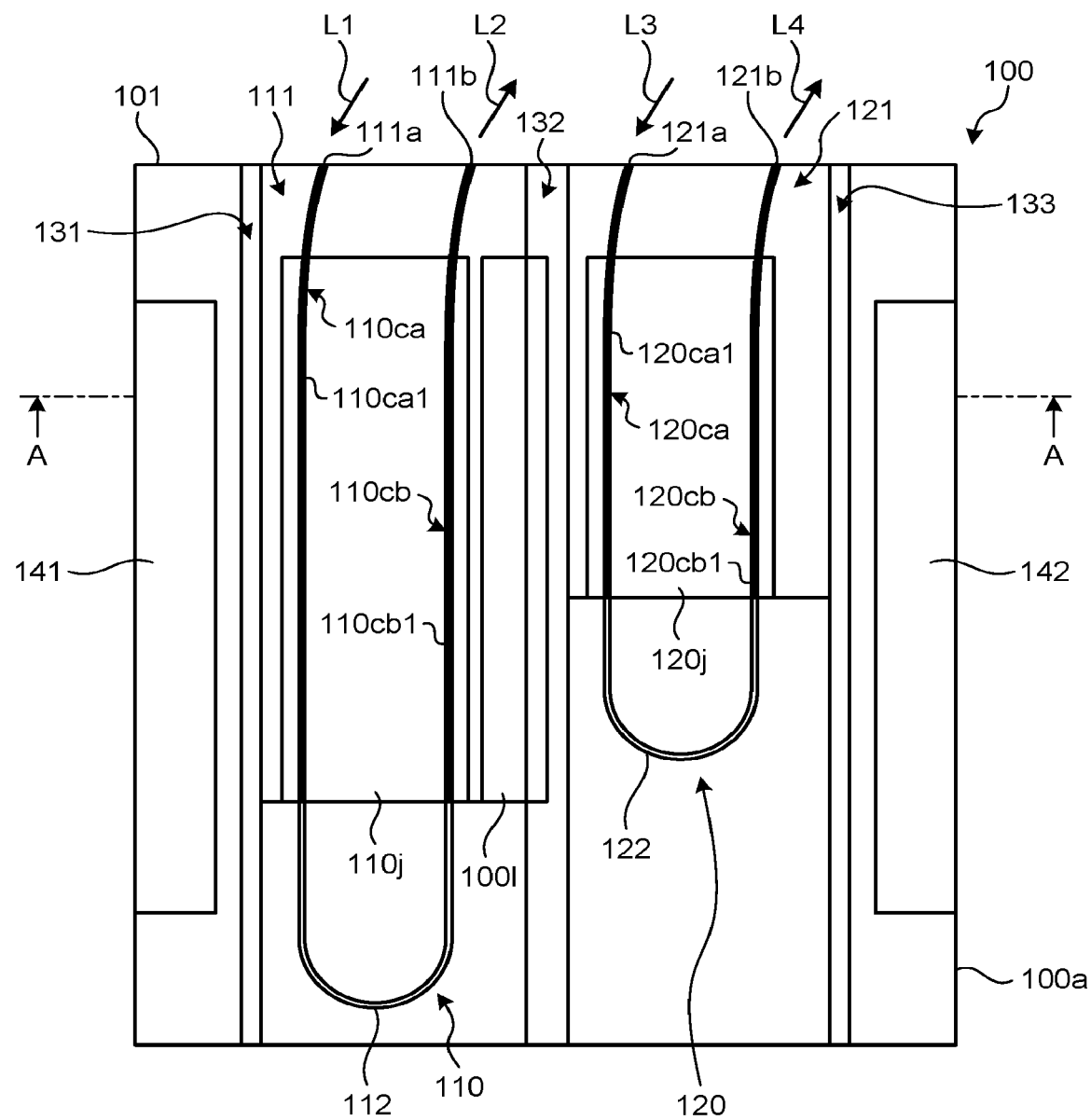
FIG. 1 is a schematic planar view of a semiconductor optical amplifier array device according to a first embodiment.

Exemplary embodiments are described below with reference to the accompanying drawings. However, the present disclosure is not limited by the embodiments. In the drawings, identical or corresponding constituent elements are referred to by the same reference numerals. Moreover, each drawing is schematic in nature, and it needs to be kept in mind that the relationships among the dimensions of the elements or the ratio of the elements may be different than the actual situation. Among the drawings too, there may be portions having different relationships among the dimensions or having different ratios.

First Embodiment

FIG. 1 is a schematic planar view of a semiconductor optical amplifier array device according to a first embodiment.

A semiconductor optical amplifier array device 100 in the chip form includes semiconductor optical amplifiers 110 and 120 as a plurality of semiconductor optical amplifiers. The semiconductor optical amplifiers 110 and 120 are formed on a substrate 100a, and are integrated onto the single substrate 100a. The semiconductor optical amplifier 110 represents an example of a first semiconductor optical amplifier, and the semiconductor optical amplifier 120 represents an example of a second semiconductor optical amplifier. The semiconductor optical amplifier array device 100 has the III-V semiconductor material as the main constituent material.

The semiconductor optical amplifier 110 includes an active portion 111 and a passive portion 112. The active portion 111 has a buried waveguide structure suitable for a light emitting device of the current injection type, and includes active layers 110ca and 110cb as optical waveguides. The passive portion 112 is bent in a horseshoe shape, and has a high-mesa waveguide structure that includes an optical waveguide serving as a passive waveguide. The high-mesa waveguide structure is also called a deep ridge waveguide structure. The passive portion 112 represents an example of a folded portion in which the light path is made of a waveguide that is practically folded at an angle of 180°.

The active layers 110ca and 110cb have a multiple quantum well (MQW) structure made of, for example, the GaInAsP-based semiconductor material or the AlGaInAs-based semiconductor material. In the passive portion 112, the cladding layer is made of the n-type InP or the i-type InP, and the optical waveguide is made of the i-type GaInAsP-based semiconductor material having the bandgap wavelength of 1300 nm, for example. The active layers 110ca and 110cb are optically connected to the optical waveguide of the passive portion 112 by a butt joint connection. The active layers 110ca and 110cb are formed substantially parallel to each other, and are optically connected to each other via the optical waveguide of the high-mesa waveguide structure of the passive portion 112. Meanwhile, the semiconductor optical amplifier 110 includes a power feeding portion 110j. Moreover, the semiconductor optical amplifier 110 includes light input-output ports 111a and 111b that are provided on a facet 101 representing one of the facets of the semiconductor optical amplifier array device 100. The light input-output ports 111a and 111b are connected to the active layers 110ca and 110cb, respectively. On the side of the facet 101, the active layers 110ca and 110cb are inclined with respect to the normal line of the facet 101.

The semiconductor optical amplifier 120 includes an active portion 121 and a passive portion 122. The active portion 121 has a buried waveguide structure, and includes active layers 120ca and 120cb as optical waveguides. The passive portion 122 is bent in a horseshoe shape, and has a high-mesa waveguide structure including an optical waveguide. The passive portion 122 represents an example of a folded portion in which the light path is made of a waveguide that is practically folded at an angle of 180°. The active layers 120ca and 120cb have the same constituent material and the same structure as the active layers 110ca and 110cb; and the passive portion 122 has the same constituent material as the passive portion 112.

The active layers 120ca and 120cb are optically connected to the optical waveguide of the passive portion 122 by a butt joint connection. The active layers 120ca and 120cb are formed substantially parallel to each other, and are optically connected to each other via the optical waveguide of the high-mesa waveguide structure of the passive portion 122. Meanwhile, the semiconductor optical amplifier 120 includes a power feeding portion 120j. Moreover, the semiconductor optical amplifier 120 includes optical input-output ports 121a and 121b that are provided on the facet 101 representing one of the facets of the semiconductor optical amplifier array device 100. The optical input-output ports 121a and 121b are connected to the active layers 120ca and 120cb, respectively. On the side of the facet 101, the active layers 120ca and 120cb are inclined with respect to the normal line of the facet 101.

Meanwhile, in between the active portions 111 and 121 and the passive portion 122, a conversion region can be provided for establishing low-loss optical connection with a waveguide having a different structure.

The semiconductor optical amplifier array device 100 further includes trench grooves 131, 132, and 133 that extend substantially parallel to each other. The trench groove 132 is formed in between the semiconductor optical amplifiers 110 and 120. The trench groove 131 is formed on the opposite side of the trench groove 132 across the semiconductor optical amplifier 110. The trench groove 133 is formed on the opposite side of the trench groove 132 across the semiconductor optical amplifier 120. The trench groove 131 is formed in order to electrically separate some part of the semiconductor optical amplifier 110 from some part of the semiconductor optical amplifier 120. The trench groove 132 is formed in order to electrically separate the semiconductor optical amplifier 110 and a physical contact region 141. The trench groove 133 is formed in order to electrically separate the semiconductor optical amplifier 120 from a physical contact region 142.

The semiconductor optical amplifier array device 100 includes the physical contact regions 141 and 142, which are positioned at both ends of the semiconductor optical amplifier array device 100 in the direction orthogonal to the direction of extension of the trench grooves 131, 132, and 133. At the time of combining the semiconductor optical amplifier array device 100 with another member, the physical contact regions 141 and 142 are placed in contact with the other member for the purpose of height alignment.

Figure 2:
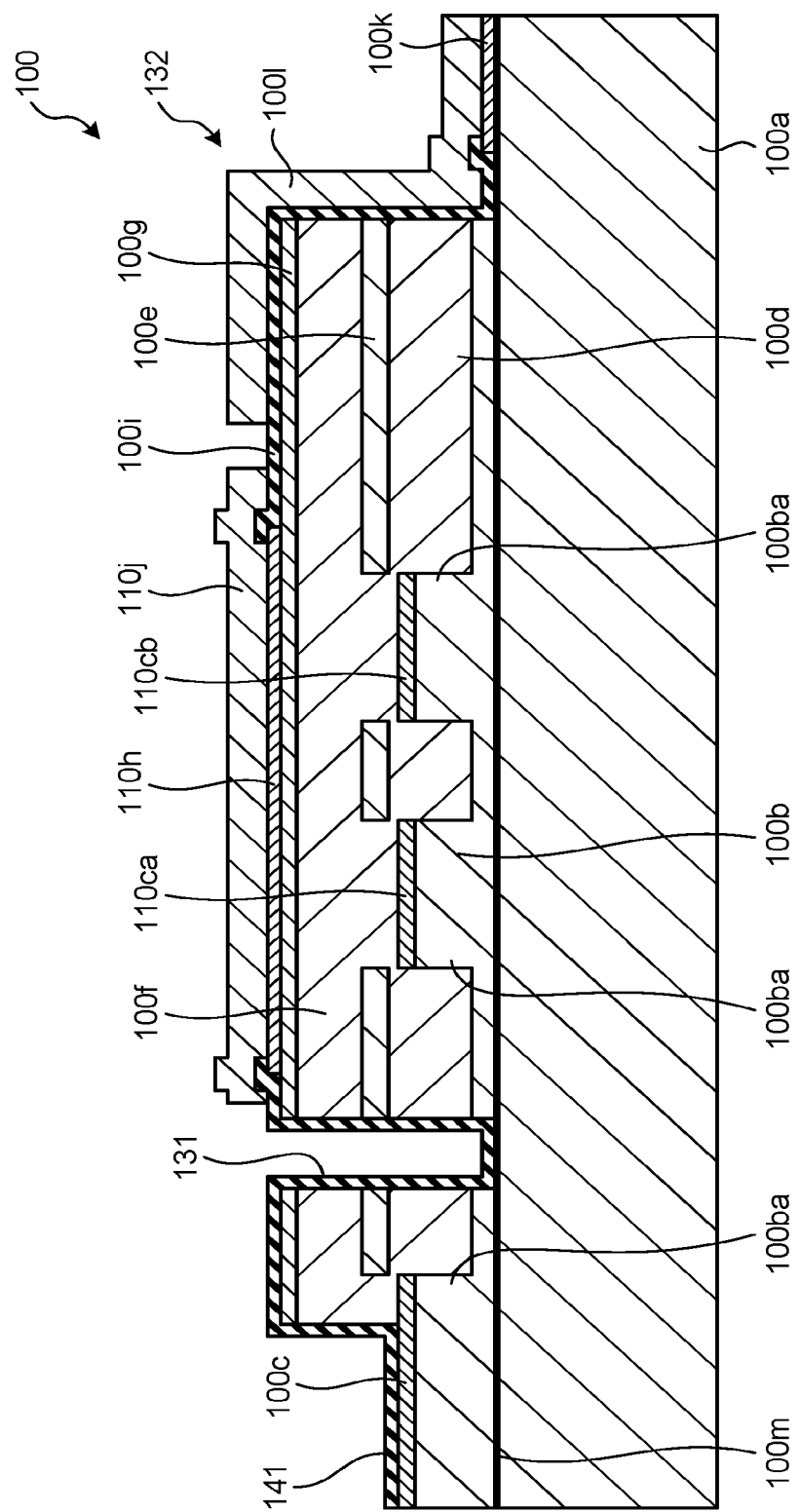
FIG. 2 is a schematic partial cross-sectional view of the semiconductor optical amplifier array device illustrated in FIG. 1.

FIG. 2 is a schematic partial cross-sectional view of the semiconductor optical amplifier array device along A-A line illustrated in FIG. 1. In FIG. 2, the cross-sectional surface on the side of the semiconductor optical amplifier 110 as viewed from the trench groove 132 is mainly illustrated. The cross-sectional surface on the side of the semiconductor optical amplifier 120 as viewed from the trench groove 132 is also identical. Hence, that explanation is not given.

The semiconductor optical amplifier array device 100 includes the substrate 100a that is made of the n-type InP, and includes a cladding layer 100b that is made of the n-type InP and that is layered on the substrate 100a. In between the substrate 100a and the cladding layer 100b, an etching stop layer 100m made of the n-type GaInAsP is present. The cladding layer 100b present across the semiconductor optical amplifier 110 and the physical contact region 141 includes three stripe mesa portions 100ba. On top of each stripe mesa portion 100ba, one of active layers 110ca, 110cb, and 100c is layered.

From either one side or both sides of the stripe mesa portions 100ba and the active layers 110ca, 110cb, and 100c; a first current blocking layer 100d made of the p-type InP is layered. On top of the first current blocking layer 100d, a second current blocking layer 100e made of the n-type InP layer is layered. The first current blocking layer 100d and the second current blocking layer 100e constitute a current blocking structure.

On top of the second current blocking layer 100e and the active layers 110ca and 110cb, a cladding layer 100f made of the p-type InP is layered. Moreover, on top of the cladding layer 100f, a contact layer 100g made of GaInAsP is layered.

The trench grooves 131, 132, and 133 are formed deep enough to reach the outer surface of the etching stop layer 100m. The trench groove 132 electrically separates the layering portion made of a p-type semiconductor of each of the semiconductor optical amplifiers 110 and 120.

An n-side contact electrode 100k is layered on some part inside the trench groove 132 so as to make ohmic contact with the substrate 100a. In an identical manner, a p-side contact electrode 110h is layered on some part of the outer surface of the contact layer 100g so as to make ohmic contact with the contact layer 100g. Of the inner surfaces of the trench grooves 131, 132, and 133 as well as of the outer surface of the contact layer 100g; the region other than the region making ohmic contact with p-side contact electrodes 110h and 120h and with the n-side contact electrode 100k is layered with a passivation layer 100i that is made of, for example, SiNx.

On top of the passivation layer 100i, power feeding portions 110j and 100l are formed, each of which is made of a bonding pad and wiring. The passivation layer 100i has an opening formed on top of the p-side contact electrode 110h, and the wiring and the p-side contact electrode 110h are electrically connected through that opening. Similarly, the passivation layer 100i has an opening formed on top of the n-side contact electrode 100k, and the wiring of the power feeding portion 100l and the n-side contact electrode 100k are electrically connected through that opening. The wiring of each of the power feeding portion 110j and 100l is drawn up to the corresponding bonding pad. Each bonding pad is formed in the upper part of the contact layer 100g. As a result, the height difference in the bonding pads on the p-side and the n-side becomes smaller.

In the physical contact regions 141 and 142, the passivation layer 100i is layered on top of the active layer 100c.

In the semiconductor optical amplifier 110, when a voltage is applied in between the power feeding portions 100l and 110j and when an electrical current is injected into active regions 110ca1 and 110cb1 that, in the active layers 110ca and 110cb, respectively, are covered by the p-side contact electrode 110h; the active regions 110ca1 and 110cb1 exert the optical amplification action. In an active layer, an active region is the region into which an electrical current is injected. As a result, the semiconductor optical amplifier 110 performs optical amplification of a light L1 input from the light input-output port 111a, and outputs the amplified light as a light L2 from the light input-output port 111b. Meanwhile, on the side of the facet 101, the active layers 110ca and 110cb are inclined with respect to the facet 101. Hence, the reflected light generated at the facet 101 is prevented from being input to the active layers 110ca and 110cb.

In an identical manner, in the semiconductor optical amplifier 120, when a voltage is applied in between the power feeding portions 100l and 120j and when an electrical current is injected into active regions 120ca1 and 120cb1 that, in the active layers 120ca and 120cb, respectively, are covered by a p-side contact electrode; the active regions 120ca1 and 120cb1 exert the optical amplification action. As a result, the semiconductor optical amplifier 120 performs optical amplification of a light L3 input from the light input-output port 121a, and outputs the amplified light as a light L4 from the light input-output port 121b. Meanwhile, on the side of the facet 101, the active layers 120ca and 120cb are inclined with respect to the facet 101. Hence, the reflected light generated at the facet 101 is prevented from being input to the active layers 120ca and 120cb.

Since the trench groove 132 electrically separates the p-type semiconductor layers of the semiconductor optical amplifiers 110 and 120, it becomes possible to drive-control the semiconductor optical amplifiers 110 and 120 in an independent manner.

In the semiconductor layered structure explained above, the active layers 110ca, 110cb, 120ca, and 120cb have the same width, the same thickness, and the same effective refractive index.

In the semiconductor optical amplifier array device 100, the length of the active region in the semiconductor optical amplifier 110 represents the total length of the active regions 110ca1 and 110cb1. That length is referred to as a first length. Moreover, the length of the active region in the semiconductor optical amplifier 120 represents the total length of the active regions 120ca1 and 120cb1. That length is referred to as a second length. Herein, the first length and the second length are different from each other. In the first embodiment, the first length is greater than the second length. As a result, it can be ensured that the amplification characteristics of the semiconductor optical amplifier 110 are different than the amplification characteristics of the semiconductor optical amplifier 120.

Meanwhile, since the light paths of the passive portions 112 and 122 are practically folded at an angle of 180°, the light input-output ports 111a and 111b of the semiconductor optical amplifier 110 as well as the light input-output ports 121a and 121b of the semiconductor optical amplifier 120 are provided on the same facet 101 of the semiconductor optical amplifier array device 100. As a result, there is an advantage of being able to consolidate the connection facet between the semiconductor optical amplifier array device 100 and other waveguide devices to a single facet. Moreover, in addition to bringing the light input-output ports 111a, 111b, 121a, and 121b on a single facet; just by changing the position of the passive portion 112 in the direction of extension of the active layers 110ca and 110cb, it becomes possible to freely adjust the lengths of the active layers 110ca and 110cb and in turn adjust the lengths of the active regions 110ca1 and 110cb1. Moreover, just by changing the position of the passive portion 122 in the direction of extension of the active layers 110ca and 110cb, it becomes possible to freely adjust the lengths of the active layers 120ca and 120cb and in turn adjust the lengths of the active regions 120ca1 and 120cb1.

Moreover, since the light paths of the passive portions 112 and 122 are practically folded at an angle of 180°, it becomes possible to shorten the device length of the semiconductor optical amplifier array device 100.

The following explanation is given about an exemplary effect of having the first length of the active region in the semiconductor optical amplifier 110 to be different than the second length of the active region in the semiconductor optical amplifier 120.

For example, a continuous light (CW light) is input as the light L1 to the semiconductor optical amplifier 110. Moreover, a modulated light is input as the light L2 to the semiconductor optical amplifier 120. In that case, for example, the first length is equal to 800 μm, and the second length is equal to 500 μm.

A semiconductor optical amplifier corresponding to a CW light is demanded to have a high output power and a high degree of efficiency. In order to achieve a high output power, it is suitable to have long active regions so as to prevent the occurrence of rollover attributed to the heat of the semiconductor optical amplifier. Moreover, in order to achieve a high degree of efficiency, it is suitable that the semiconductor optical amplifier operates in a saturation region so that the stimulated emission becomes dominant. For that reason, it is desirable that the semiconductor optical amplifier has long active regions, or it is desirable that the optical confinement coefficient for the active layers is large.

On the other hand, a semiconductor optical amplifier corresponding to a modulated light is demanded to hold down the pattern effect. In order to hold down the pattern effect, the semiconductor optical amplifier needs to operate in a linear region according to the injected current so that the stimulated emission becomes negligibly small. For that reason, it is desirable that the semiconductor optical amplifier has short active regions, or it is desirable that the optical confinement coefficient for the active layers is small.

In this way, in such two semiconductor optical amplifiers having different intended end-usages, the required characteristics are different from each other, and the measures for optimization are almost totally opposite. Hence, it is mandatory that the semiconductor optical amplifiers are optimized on an individual basis.

As explained above, in order to perform individual optimization, the optical confinement coefficient for the active layers can be set to be different in the two semiconductor optical amplifiers. In that case, it is required to manufacture two types of active layers having different structures. However, in an active layer, as compared to a passive waveguide, it is required to have a more precise composition control with respect to a multicomponent semiconductor material serving as the constituent material. Hence, the manufacturing method becomes complex.

In contrast, in the semiconductor optical amplifier array device 100 according to the first embodiment, in addition to benefitting from the folding arrangement, individual optimization can also be easily achieved by adjusting the lengths of the active regions. Hence, it becomes possible to have a configuration including the semiconductor optical amplifiers 110 and 120 that are individually optimized for the CW light and the modulated light, respectively.

Manufacturing Method

Given below is the explanation of an exemplary manufacturing method for manufacturing the semiconductor optical amplifier array device 100. Firstly, a buffer layer made of the n-type InP is crystal-grown on the outer surface of the substrate 100a in the wafer form; and then the etching stop layer 100m, the cladding layer 100b, an active layer, and a p-type InP layer are crystal-grown in that order.

Subsequently, of the crystal-grown active layer, other than the regions corresponding to the active layers 110ca, 110cb, 120ca, and 120cb and other than the active layers that should be kept intact in the physical contact regions 141 and 142 (such as the active layer 100c); the p-type InP layer and the active layer of the other regions are removed by etching, and an i-type GaInAsP layer and an i-type InP layer are subjected to butt joint growth in the post-removal regions. The i-type GaInAsP layer serves as the optical waveguide of the passive portions 112 and 122, and the i-type InP layer serves as the cladding layer of the passive portions 112 and 122.

Subsequently, mesa etching is performed in order to form a buried (BH) structure of the cladding layer 100b and the active layer; so that the stripe mesa portion 100ba and the active layers 110ca, 110cb, and 100c are formed. Moreover, the first current blocking layer 100d and the second current blocking layer 100e are crystal-grown to form a BH structure. At that time, as explained earlier, the regions serving as the physical contact regions 141 and 142 are protected so that the active layer 100c is left intact. Moreover, the region that would later serve as a high-mesa waveguide is protected over a somewhat wider area.

Then, in the entire region of the crystal-grown substrate 100a, the cladding layer 100f and the contact layer 100g are crystal-grown in that order.

Subsequently, from the portion other than the required portion, the contact layer 100g is removed by etching. At that time, the cladding layer 100f too can be partially thinned.

Then, the p-side contact electrode 110h is formed by vapor deposition.

Subsequently, the high-mesa waveguide structures of the passive portions 112 and 122 are formed by etching.

Then, the physical contact regions 141 and 142 and the trench grooves 131, 132, and 133 are formed by wet etching. At that time, if the selective etching of InP is performed using hydrochloric-acid-based etching, etching stops at the outer surface of the etching stop layer 100m and the active layer 100c made of GaInAsp, so that the physical contact regions 141 and 142 and the trench grooves 131, 132, and 133 can be formed with excellent reproducibility up to the desired depth and can have the outer surfaces exposed.

Particularly, since the active layer 100c is used as the etching stop layer, there is an increase in the relative height accuracy between the physical contact regions 141 and 142 and the active layers 110ca, 110cb, 120ca, and 120cb. For example, in the case of forming a physical contact region on a surface identical to a bonding pad, the difference in height with respect to the active layers 110ca, 110cb, 120ca, and 120cb becomes equal to, for example, about 4.5 µm as the design central value. In contrast, in the semiconductor optical amplifier array device 100, the difference in height between the physical contact regions 141 and 142 and the active layers 110ca, 110cb, 120ca, and 120cb is, for example, about 0.4 µm as the design central value. Hence, even if there is a mismatch of 10% in the manufacturing thickness during the formation of the passivation layer 100i, it can be said that the configuration of the semiconductor optical amplifier array device 100 enables achieving reduction in the variability to less than $\frac{1}{10}$.

Subsequently, the n-side contact electrode 100k is formed by vapor deposition. Moreover, the passivation layer 100i is formed. Then, in order to achieve electrical contact, the passivation layer 100i at predetermined positions is removed by etching. That is followed by the formation of the power feeding portions 110j, 120j, and 100l by vapor deposition.

Subsequently, the wafer is ground/polished to a predetermined thickness. That marks the completion of the wafer processing. Moreover, the finished wafer is cleaved so as to form the facets of each semiconductor optical amplifier array device 100. Then, low-reflection coating is performed on the facet 101 representing the input-output ports. Then, the semiconductor optical amplifier array devices 100 are clipped on a chip-by-chip basis from the wafer, and predetermined examination is performed. That marks the completion of the semiconductor optical amplifier array devices 100.

Reference Configuration

Figure 3:
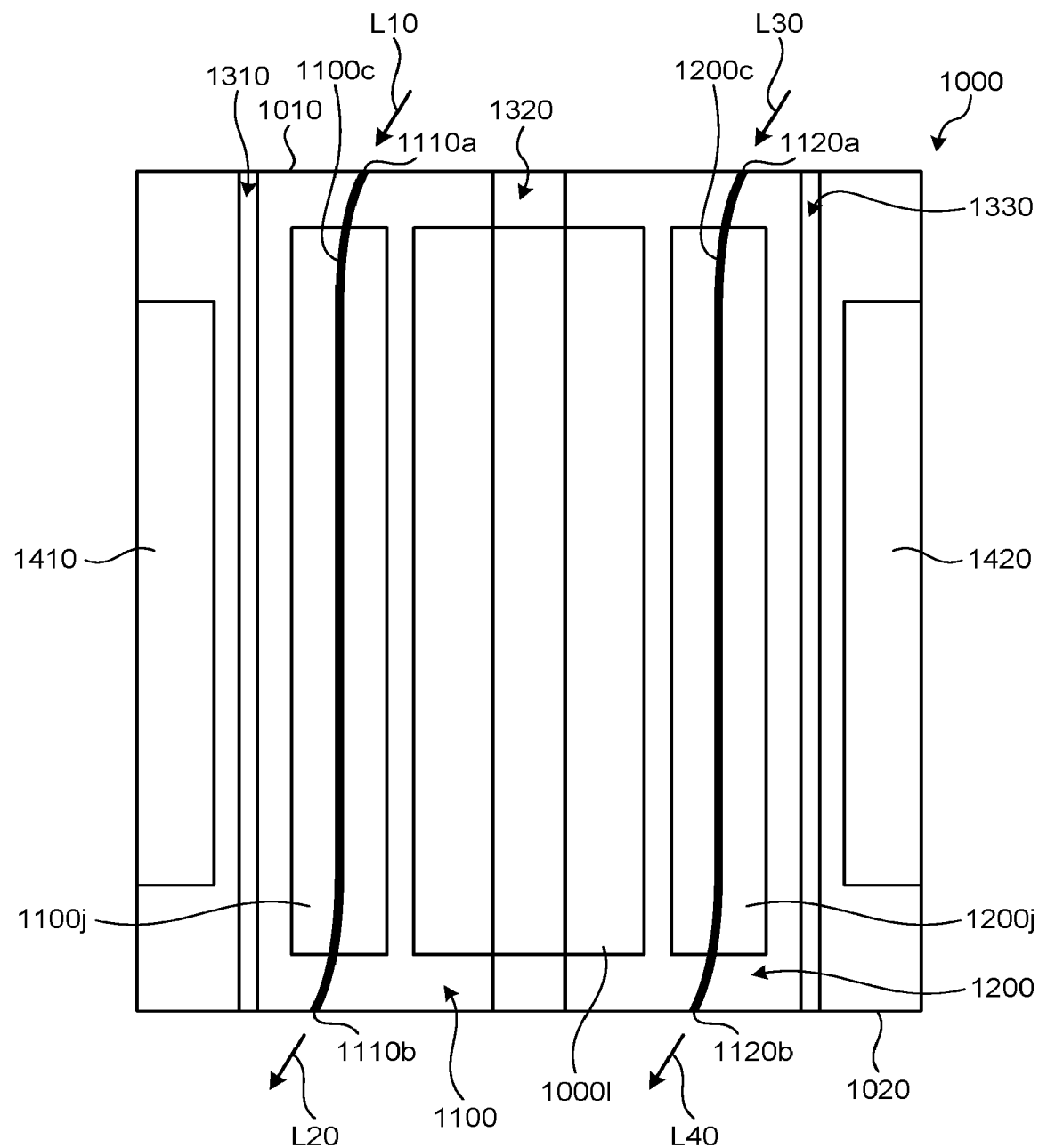
FIG. 3 is a schematic planar view of a semiconductor optical amplifier array device according to a reference configuration.

As a reference configuration, explained below is the study of a semiconductor optical amplifier array device 1000 having the configuration illustrated in FIG. 3.

The semiconductor optical amplifier array device 1000 has the III-V semiconductor material as the main constituent material, and includes semiconductor optical amplifiers 1100 and 1200.

The semiconductor optical amplifier 1100 has a buried waveguide structure and includes, as an optical waveguide, an active layer 1100c having, for example, the MQW structure made of a GaInAsP-based semiconductor material or an AlGaInAs-based semiconductor material. Moreover, the semiconductor optical amplifier 1100 includes a power feeding portion 1100j. Furthermore, the semiconductor optical amplifier 1100 includes light input-output ports 1110a and 1110b. The light input-output ports 1110a and 1110b are provided on facets 1010 and 1020, respectively, that are the opposite facets of the semiconductor optical amplifier array device 1000.

The semiconductor optical amplifier 1200 includes an active layer 1200c as an optical waveguide. The active layer 1200c has the same constituent material and the same structure as the active layer 1100c.

Moreover, the semiconductor optical amplifier 1200 includes a power feeding portion 1200j. Furthermore, the semiconductor optical amplifier 1200 includes light input-output ports 1120a and 1120b. The light input-output ports 1120a and 1120b are provided on the facets 1010 and 1020, respectively.

The semiconductor optical amplifier array device 1000 further includes trench grooves 1310, 1320, and 1330 that extend substantially parallel to each other. The trench groove 1320 is formed in between the semiconductor optical amplifiers 1100 and 1200. The trench groove 1310 is formed on the opposite side of the trench groove 1320 across the semiconductor optical amplifier 1100. The trench groove 1330 is formed on the opposite side of the trench groove 1320 across the semiconductor optical amplifier 1200.

Furthermore, the semiconductor optical amplifier array device 1000 includes physical contact areas 1410 and 1420, which are positioned at both ends of the semiconductor optical amplifier array device 1000 in the direction orthogonal to the direction of extension of the trench grooves 1310, 1320, and 1330.

In the semiconductor optical amplifier 1100, in the state in which an electrical current is injected into the active layer 1100c so as to make it exert the optical amplification action, a light L10 input from the light input-output port 1110a, which is present on the facet 1010, is subjected to optical amplification and is output as a light L20 from the light input-output port 1110b present on the facet 1020. In an identical manner, in the semiconductor optical amplifier 1200, in the state in which an electrical current is injected into the active layer 1200c so as to make it exert the optical amplification action, a light L30 input from the light input-output port 1120a, which is present on the facet 1010, is subjected to optical amplification and is output as a light L40 from the light input-output port 1120b present on the facet 1020.

In the semiconductor optical amplifier 1100 having such a configuration, two opposite facets serve as the connection facets for other waveguide devices. Hence, either due to an increase in the connection points or if the distances from the connection points of a connection partner to the facets 1010 and 1020 are not accurately matched, then there is a risk of an increase in the connection loss. Moreover, in the semiconductor optical amplifier 1100, it becomes difficult to keep the lengths of the active layers 1100c and 1200c different from each, thereby making them unsuitable for individual optimization.

Second Embodiment

Figure 4:
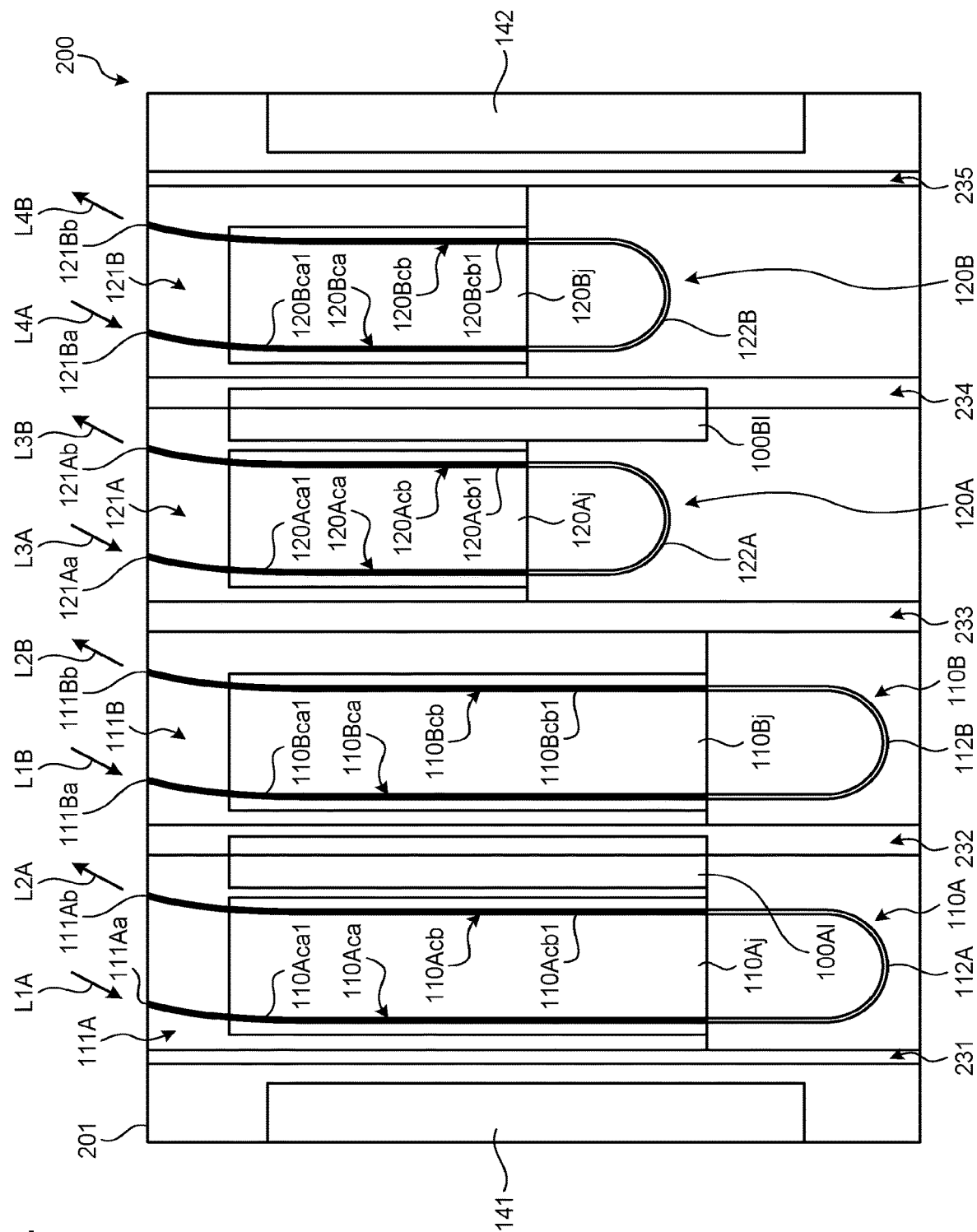
FIG. 4 is a schematic planar view of a semiconductor optical amplifier array device according to a second embodiment.

FIG. 4 is a schematic planar view of a semiconductor optical amplifier array device according to a second embodiment.

A semiconductor optical amplifier array device 200 in the chip form includes semiconductor optical amplifiers 110A, 110B, 120A, and 120B as a plurality of semiconductor optical amplifiers integrated onto a single substrate. The semiconductor optical amplifiers 110A and 110B are examples of first-type semiconductor optical amplifiers, and the semiconductor optical amplifiers 120A and 120B are examples of second-type semiconductor optical amplifiers. Meanwhile, the semiconductor optical amplifier array device 200 has the III-V semiconductor material as the main constituent material.

The semiconductor optical amplifiers 110A and 110B have an identical configuration to the semiconductor optical amplifier 110 according to the first embodiment. That is, the semiconductor optical amplifier 110A includes an active portion 111A and a passive portion 112A. The semiconductor optical amplifier 120A includes an active portion 111B and a passive portion 112B. The active portion 111A includes active layers 110Aca and 110Acb, and the active portion 111B includes active layers 110Bca and 110Bcb. Moreover, the semiconductor optical amplifiers 110A and 110B include power feeding portions 110Aj and 110Bj, respectively. Furthermore, the semiconductor optical amplifiers 110A and 110B have light input-output ports 111Aa and 111Ab and light input-output ports 111Ba and 111Bb, respectively, provided on a facet 201 that is one of the facets of the semiconductor optical amplifier array device 200.

The semiconductor optical amplifiers 120A and 120B have an identical configuration to the semiconductor optical amplifier 120 according to the first embodiment. That is, the semiconductor optical amplifier 120A includes an active portion 121A and a passive portion 122A. The semiconductor optical amplifier 120B includes an active portion 121B and a passive portion 122B. The active portion 121A includes active layers 120Aca and 120Acb, and the active portion 121B includes active layers 120Bca and 120Bcb. Moreover, the semiconductor optical amplifiers 120A and 120B include power feeding portions 120Aj and 120Bj, respectively. Furthermore, the semiconductor optical amplifiers 120A and 120B have light input-output ports 121Aa and 121Ab and light input-output ports 121Ba and 121Bb, respectively, provided on the facet 201 of the semiconductor optical amplifier array device 200.

The semiconductor optical amplifier array device 200 further includes trench grooves 231, 232, 233, 234, and 235 that extend substantially parallel to each other. The trench groove 232 is formed in between the semiconductor optical amplifiers 110A and 110B. The trench groove 233 is formed in between the semiconductor optical amplifiers 110B and 120A. The trench groove 234 is formed in between the semiconductor optical amplifiers 120A and 120B. The trench groove 231 is formed on the opposite side of the trench groove 232 across the semiconductor optical amplifier 110A. The trench groove 235 is formed on the opposite side of the trench groove 234 across the semiconductor optical amplifier 120B. The trench groove 232 is disposed in order to electrically separate some part of the semiconductor optical amplifier 110A from some part of the semiconductor optical amplifier 110B. The trench groove 233 is disposed in order to electrically separate some part of the semiconductor optical amplifier 110B from some part of the semiconductor optical amplifier 120A. The trench groove 234 is disposed in order to electrically separate some part of the semiconductor optical amplifier 120A from some part of the semiconductor optical amplifier 120B. The trench groove 231 is disposed in order to electrically separate the semiconductor optical amplifier 110A from the physical contact region 141. The trench groove 235 is disposed in order to electrically separate the semiconductor optical amplifier 120B from the physical contact region 142.

Thus, in an identical manner to the semiconductor optical amplifier array device 100, the semiconductor optical amplifier array device 200 includes the physical contact regions 141 and 142, which are positioned at both ends of the semiconductor optical amplifier array device 200 in the direction orthogonal to the direction of extension of the trench grooves 231, 232, and 233, and 234, and 235.

In the semiconductor optical amplifier array device 200, the cross-sectional structures and the constituent materials of the elements are same as the corresponding cross-sectional structures and the constituent materials of the corresponding elements in the semiconductor optical amplifier array device 100. Hence, that explanation is not given again.

In the semiconductor optical amplifier 110A, when an electrical current is injected into active regions 110Aca1 and 110Acb1 that, in the active layers 110Aca and 110Acb, respectively, are covered by a p-side contact electrode; the active regions 110Aca1 and 110Acb1 exert the optical amplification action. As a result, the semiconductor optical amplifier 110A performs optical amplification of a light L1A input from the light input-output port 111Aa, and outputs the amplified light as a light L2A from the light input-output port 111Ab.

In an identical manner, in the semiconductor optical amplifier 110B, when an electrical current is injected into active regions 110Bca1 and 110Bcb1 that, in the active layers 110Bca and 110Bcb, respectively, are covered by a p-side contact electrode; the active regions 110Bca1 and 110Bcb1 exert the optical amplification action. As a result, the semiconductor optical amplifier 110B performs optical amplification of a light L1B input from the light input-output port 111Ba, and outputs the amplified light as a light L2B from the light input-output port 111Bb.

In an identical manner, in the semiconductor optical amplifier 120A, when an electrical current is injected into active regions 120Aca1 and 120Acb1 that, in the active layers 120Aca and 120Acb, respectively, are covered by a p-side contact electrode; the active regions 120Aca1 and 120Acb1 exert the optical amplification action. As a result, the semiconductor optical amplifier 120A performs optical amplification of a light L3A input from the light input-output port 121Aa, and outputs the amplified light as a light L3B from the light input-output port 121Ab.

In an identical manner, in the semiconductor optical amplifier 120B, when an electrical current is injected into active regions 120Bca1 and 120Bcb1 that, in the active layers 120Bca and 120Bcb, respectively, are covered by a p-side contact electrode; the active regions 120Bca1 and 120Bcb1 exert the optical amplification action. As a result, the semiconductor optical amplifier 120B performs optical amplification of a light L4A input from the light input-output port 121Ba, and outputs the amplified light as a light L4B from the light input-output port 121Bb.

Meanwhile, because of the trench grooves 232, 233, and 234; it becomes possible to drive-control the semiconductor optical amplifiers 110A, 110B, 120A, and 120B in an independent manner.

In the semiconductor layered structure explained above, the active layers 110Aca, 110Acb, 110Bca, 110Bcb, 120Aca, 120Acb, 120Bca, and 120Bcb have the same width, the same thickness, and the same effective refractive index.

In the semiconductor optical amplifier array device 200, the first length of the active region is same in the semiconductor optical amplifiers 110A and 110B, and the second length of the active region is same in the semiconductor optical amplifiers 120A and 120B. Herein, the first length and the second length are different from each other. In the second embodiment, the first length is greater than the second length. As a result, it can be ensured that: the amplification characteristics of the semiconductor optical amplifiers 110A and 110B are same; the amplification characteristics of the semiconductor optical amplifiers 120A and 120B are same; and the amplification characteristics of the semiconductor optical amplifiers 110A and 110B are different than the amplification characteristics of the semiconductor optical amplifiers 120A and 120B.

Moreover, the light input-output ports of each of the semiconductor optical amplifiers 110A, 110B, 120A, and 120B are provided on the same facet 201 of the semiconductor optical amplifier array device 200. As a result, there is an advantage of being able to consolidate the connection facet between the semiconductor optical amplifier array device 200 and other waveguide devices to a single facet. Furthermore, just by changing the position of the passive portions 112A, 112B, 122A, and 122B; it becomes possible to freely adjust the lengths of the respective active layers and in turn adjust the lengths of the respective active regions.

In the passive portions 112A, 112B, 122A, and 122B; the light path is practically folded at an angle of 180°. Hence, it becomes possible to shorten the device length of the semiconductor optical amplifier array device 200.

In this way, in the semiconductor optical amplifier array device 200, in addition to benefitting from the folding arrangement, individual optimization can also be easily achieved by adjusting the lengths of the active regions. Hence, it becomes possible to have a configuration including the semiconductor optical amplifiers 110A and 110B that are individually optimized for the CW light, and including the semiconductor optical amplifiers 120A and 120B that are individually optimized for the modulated light.

It is suitable to use the semiconductor optical amplifier array device 200 in combination with, for example, a DP-IQ modulator (DP stands for Dual Polarization). For example, CW lights having mutually orthogonal linearly polarized waves are input as the lights L1A and L1B to the semiconductor optical amplifier array device 200, so that optical amplification is performed by the semiconductor optical amplifiers 110A and 110B and the lights L2A and L2B are output. Then, the lights L2A and L2B are input to an IQ modulator, and the lights L3A and L3B are generated as modulated lights. Subsequently, the lights L3A and L4A are input to the semiconductor optical amplifier array device 200, so that optical amplification is performed by the semiconductor optical amplifiers 120A and 120B and the lights L3B and L4B are output as modulated lights. In the semiconductor optical amplifier array device 200, since four semiconductor optical amplifiers are integrated into a single chip, it becomes possible to reduce the man-hours for manufacturing and assembly.

Third Embodiment

Figure 5:
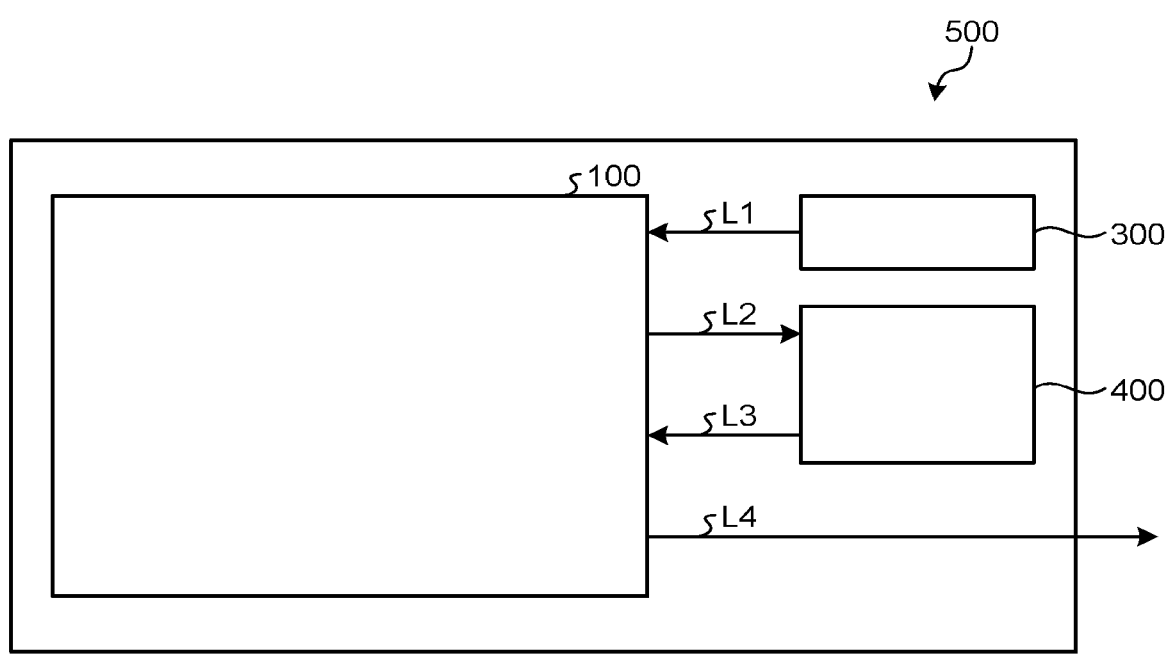
FIG. 5 is a schematic planar view of an optical module according to a third embodiment.

FIG. 5 is a schematic planar view of an optical module according to a third embodiment. An optical module 500 includes the semiconductor optical amplifier array device 100 according to the first embodiment; a CW light source 300 such as a laser light source; and a modulator 400 such as an InP modulator.

In the optical module 500, the CW light source 300 outputs the light L1, which is the CW light, to the semiconductor optical amplifier array device 100. In the semiconductor optical amplifier array device 100, the semiconductor optical amplifier 110 performs optical amplification of the light L1, and outputs the amplified light as the light L2 to the modulator 400. Then, the modulator 400 modulates the light L2 input thereto and outputs the modulated light as the light L3 to the semiconductor optical amplifier array device 100. In the semiconductor optical amplifier array device 100, the semiconductor optical amplifier 120 performs optical amplification of the light L3 and outputs the amplified light as the light L4 from the optical module 500.

Meanwhile, in the embodiments explained above, a passive portion is bent in a horseshoe shape, and constitutes a folded portion in which the light path is practically folded at an angle of 180°. However, alternatively, the bend need not be continuous and can be divided into a few bent portions having linear portions present therebetween; or there can be a slight different of a few degrees in the angle of the bend. Moreover, the total of the bending angles of the portions in which an active layer is bending from a light input-output port can be equal to 180°. Furthermore, the angle of inclination on the side of the light input-output port on which the light is input and the angle of inclination on the side of the light input-output port from which the light is output can be set to be inclinations in the opposite directions. with that, the angle of folding in the passive portion can be set to an angle other than 180°. However, since the waveguide formation process of an active layer is dependent on the plane direction of the crystals of the semiconductor material, it is desirable to set the folding or the angle of the bend in such a way that the angle of each active layer with respect to the plane direction of the crystals is nearly equal.

According to the present disclosure, it becomes possible to implement a semiconductor optical amplifier array device in which semiconductor optical amplifiers having mutually different characteristics are integrated.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A semiconductor optical amplifier array device comprising:
   a substrate; and
   a plurality of semiconductor optical amplifiers formed on the substrate, each of the semiconductor optical amplifiers including
      two active regions,
      a passive portion, and
      two input-output ports optically connected to the active regions respectively and disposed on same facet of the semiconductor optical amplifier array device, wherein
   the plurality of semiconductor optical amplifiers include
      a first semiconductor optical amplifier in which length of the active region is equal to a first length, and
      a second semiconductor optical amplifier in which length of the active region is equal to a second length that is different from the first length,
   the two active regions are parallel to each other and are optically connected to each other via the passive portion,
   the passive portion includes a folded portion being formed of a high-mesa passive waveguide that is practically folded at an angle of 180°,
   a trench groove is formed to electrically separate some part of the first semiconductor optical amplifier from some part of the second optical amplifier,
   the first semiconductor optical amplifier and the second optical amplifier are driven in an independent manner, and
   lengths of the two active regions are adjusted by changing a position of the passive portion in a direction of extension of the two active regions.

2. The semiconductor optical amplifier array device according to claim 1, wherein
   the first length is greater than the second length,
   a continuous light is input to one of the two light input-output port provided in the first semiconductor optical amplifier, and
   a modulated light is input to another one of the two light input-output port provided in the second semiconductor optical amplifier.

* * * * *